MOTOR DRIVE CIRCUITS

Filed March 22, 1963 3 Sheets-Sheet 1

INVENTOR.
MARTYN A. LEWIS

BY Robert G. Clay

ATTORNEY

INVENTOR.
MARTYN A. LEWIS
BY Robert G. Clay
ATTORNEY

INVENTOR.
MARTYN A. LEWIS
BY Robert G. Clay
ATTORNEY

United States Patent Office 3,293,522 Patented Dec. 20, 1966

3,293,522

MOTOR DRIVE CIRCUITS

Martyn A. Lewis, Los Angeles, Calif., assignor to Ampex Corporation, Redwood City, Calif., a corporation of California Filed Mar. 22, 1963, Ser. No. 267,166
10 Claims. (Cl. 318—327)

This invention relates to motor drive systems, and particularly to simple and economical motor drive systems for providing intermittent and bidirectional operation of low inertia motors.

It is necessary for many modern applications to drive a motor, such as those used in transporting a tape or a web material in a controlled fashion, through an arbitrary sequence of bidirectional movements. In addition to maintaining the moving speed of the motor at a selected nominal velocity, such systems must provide precise start-stop characteristics at high accelerative levels. A good example of particular requirements which must be met by motor drive systems is found in present day magnetic tape transport systems, particularly those used for digital data processing applications, because such systems must co-operate with the demand for information from high speed data processing systems and must accordingly operate with high speed precision in all respects. Therefore, the discussion will proceed with relation to such tape transport systems. Like system requirements are to be found in a number of other motor drive systems besides tape or web applications, however, and the invention should be considered to be applicable to all such systems.

In providing maximum data transfer compatibility with data processing systems, previous magnetic tape transports employed a pair of contra-rotating drive capstans, against either of which the tape could be forcibly engaged by the action of an associated pinch roller mechanism for movement in the selected direction. Although the pinch roller mechanisms could be actuated or disengaged very rapidly, such systems experience a brief but significant dead time after a start or stop command is received until the pinch roller makes or breaks contact with the tape and capstan. Upon making or breaking contact, the tape is subjected to a large tension impulse in being brought up to nominal speed or stopped. The total time interval involved in starting or stopping a tape by one of the systems is of the order of a few milliseconds, which is a relatively long interval for high speed computers even though very short for most mechanical systems.

Distances travelled by the tape during these start and stop intervals are also of importance, because gaps must be provided on the tape between successive records during which no data transfer can take place until nominal velocity has been reached. These inter-record gaps must be made adequate for all conditions which might be encountered. Thus, the gaps must be sufficiently long to account for the maximum tape slippage due to accumulation of oxide material on the contacting elements, or due to wear or slight misalignment of elements contacting the tape, or due to changes of tape direction called for by programming. The increase in gap length for all these likely variations results in decrease of the density with which data may be recorded on a given length of tape, even though the bit per inch density remains the same throughout a record.

Systems using contra-rotating capstans with associated pinch rollers and including tape loop buffer mechanisms, such as multiple loop tension arms or vacuum chambers between the capstans and the associated tape storage reels, are complex and expensive. While capable of providing the high performance necessary for most data precessing systems, these systems lack, as noted above, predictable start-stop characteristics, which would allow more economical use of a given tape length. The same deficiencies occur in other systems utilizing other drive capstan arrangements, such as one system in which a single drive capstan is employed which may be driven in either direction of rotation from a pair of contra-rotating, constant speed flywheels, either of which may be engaged by an associated magnetically operated drive roller. Such systems are, however, subject to many of the same deficiencies as the dual capstan systems in that proper operation requires high impact and frictional forces which subject tape movement to similar irregularities in starting and stopping.

In systems of this nature, relatively high speed servo responses in the tape reel mechanisms are needed to absorb the tension transients, and to respond with sufficient rapidity to the sudden acceleration and deceleration of the tape. Relatively high level power supplies are needed to drive the tape reel mechanisms as well as to provide the pulses needed for sudden actuation of the pinch roller mechanisms. Furthermore, where flywheel systems are involved, servo control of the capstan's speed requires that a high power level be available at the driving motor because of the inertia of the flywheel which must be overcome as well as the sudden impact and tension forces on the flywheel which must be compensated.

One method of avoiding the aforementioned problems encountered by these magnetic tape transport systems, as more fully explained in connection with the co-pending applications of Robert A. Kleist entitled "Drive System for Tape Transport Systems," Ser. No. 267,175, now Patent No. 3,185,364, and Robert A. Kleist and Ben C. Wang, entitled "Magnetic Tape Transport System," Ser. No. 268,140, now Patent No. 3,251,563, both assigned to the assignee of the present invention and filed concurrently herewith, employs a single drive capstan coupled directly to the rotor of a reversible drive motor. The drive capstan is in constant engagement with the tape, which is held in a low friction, relatively low tension path. The tape path is so arranged as to provide a large angle of tape wrap around the capstan in order to eliminate slip between capstan and tape. The tension of the tape is maintained substantially equal on both sides of the capstan and sufficiently high to draw the tape from the capstan during acceleration. The tension is so low that no loading of the capstan is introduced, and controlled acceleration characteristics may be imparted to the tape solely by electrical control in starting and stopping the capstan drive motor. Therefore, the effectiveness of this type of system requires, among other things, accurate control of the acceleration and deceleration of a motor used for a capstan drive, and subsequently maintaining the motor at the selected nominal velocity, all in response to applied command signals available from a data processing or other system.

Therefore, it is an object of the present invention to provide improved circuits for driving a motor bidirectionally at a selected nominal velocity with controlled start and stop characteristics.

Another object of the present invention is to provide an improved motor drive system for transporting tape or web material bidirectionally at a selected nominal velocity with controlled start and stop characteristics.

A further object of the present invention is to provide an improved magnetic tape transport system for intermittent, bidirectional operation, which system is characterized by simplicity, predictability of start-stop characteristics, economy of parts, and uniform response to simple commands.

Yet another object of this invention is to provide an improved amplifier circuit for providing driving current at a closely controlled level to the windings of a driving motor.

Yet a further object of the invention is to provide an input circuit for producing output signals at a uniform level in either polarity in response to input command signals.

These and other objects of the present invention are achieved by a motor drive system including circuitry for receiving simple command signals and providing closely controlled starting, stopping and continuous speed energizing currents for movement of a motor in either direction. In response to the commands, a constant magnitude current is provided by the circuit to the winding of the motor to accelerate or decelerate to a point near the desired velocity, at which time the motor current automatically adjusts in accordance with the difference between the desired and the actual motor speed. A specific example of a system in accordance with the invention includes a motor having a substantially linear torque-current characteristic over a relatively wide range which is directly coupled to the drive capstan of a magnetic tape transport system. The magnetic tape is held in constant engagement with the surface of the capstan, and is disposed in a low friction, low tension, path, as previously described. The driving circuit includes a saturable transistor power amplifier for driving the motor while a D.C. tachometer senses motor velocity to deliver a feed-back signal proportional to the velocity sensed. An input circuit responsive to the command signals, delivers a reference signal of the desired polarity, which has a constant level proportional to the desired nominal tape speed. The feed-back signal is then compared with the reference signal to produce a difference signal which is fed to the transistor amplifier to drive the motor. The transistor amplifier has a relatively high gain, and is so constructed that difference signals greater than a certain level cause the amplifier to saturate and feed current at a constant saturation level to the motor. As the motor nears the nominal speed, the difference signal drops below saturation level, and the amplifier operates in linear fashion to feed a current to the motor proportional to the amount of the difference signal. Therefore, the motor is driven at a constant high torque during an initial interval after a command signal has been received until the motor speed approaches that desired, at which time the torque is decreased to the point necessary to maintain the desired speed by overcoming friction losses.

This simple arrangement may be used to operate in integrated fashion with low friction, low tension tape transport systems to provide direct and uniform acceleration and deceleration of the tape, as well as constant speed control. Acceleration distances and deceleration distances are under control irrespective of program sequences.

In accordance with another feature of the invention, an input circuit is provided to produce the closely controlled reference signals needed for the operation of the system in response to simple unregulated command signals received from external circuitry upon a single input terminal. Equal positive and negative voltages, which are closely regulated, are coupled to opposite sides of a balanced voltage divider circuit so that a zero voltage appears at the output terminal. A pair of gating elements, each responsive to a different polarity of command signal, selectively remove one or the other of the regulated voltages by connecting one side of the divider to ground potential, thereby establishing a fixed proportion of the other regulated voltage on the output terminal to be applied as a reference signal to the motor drive system for forward or reverse actuation of the motor. In the absence of a command signal, the input circuit produces no output, either positive or negative, at its output terminal. However, the input circuit may include another gating arrangement coupled to the output terminal to be controlled in accordance with signals supplied to a second input terminal for "stop-go" control, in addition to that provided by the absence of a command signal on the first input terminal. This additional gate connects the output terminal to ground in the absence of a "go" signal.

Another feature of the invention provides an improved saturable amplifier which closely controls the maximum amount of current available to the motor windings during its operation above the saturation level. The reference signal from the input circuit is applied through a voltage divider circuit, one portion of which is formed by a variable impedance, to control the amount of current passing through the amplifier element to the motor windings. A small current sensing resistor, coupled in series with the motor windings, applies a voltage to the variable impedance in order to control the proportion of the current reaching the input of the amplifier element, and thus prevents the amount of current delivered to the motor windings from exceeding a certain level. The amplifier provides a constant saturation current level to the motor windings in either direction either by means of a bridge circuit and a single power source, or from two power sources of opposite polarity, with the amount of current being controlled in like fashion in either direction.

Another feature of the present invention is the provision of an improved incremental drive system for tape recorders, which system may be operated in a continuous mode simply by control of the input command signals. The drive system is energized concurrently with the entry of data, the start pulse being applied for a selected interval. In accordance with the operation previously described, the tape is accelerated in controlled fashion over the interval of the start pulse, then decelerated in controlled fashion until it is stopped. The total increment of movement is readily varied simply by selection of the start pulse amplitude and duration.

A better understanding of the invention may be had by reference to the following detailed description, taken in conjunction with the accompanying drawings in which.

Figures 1, 7:
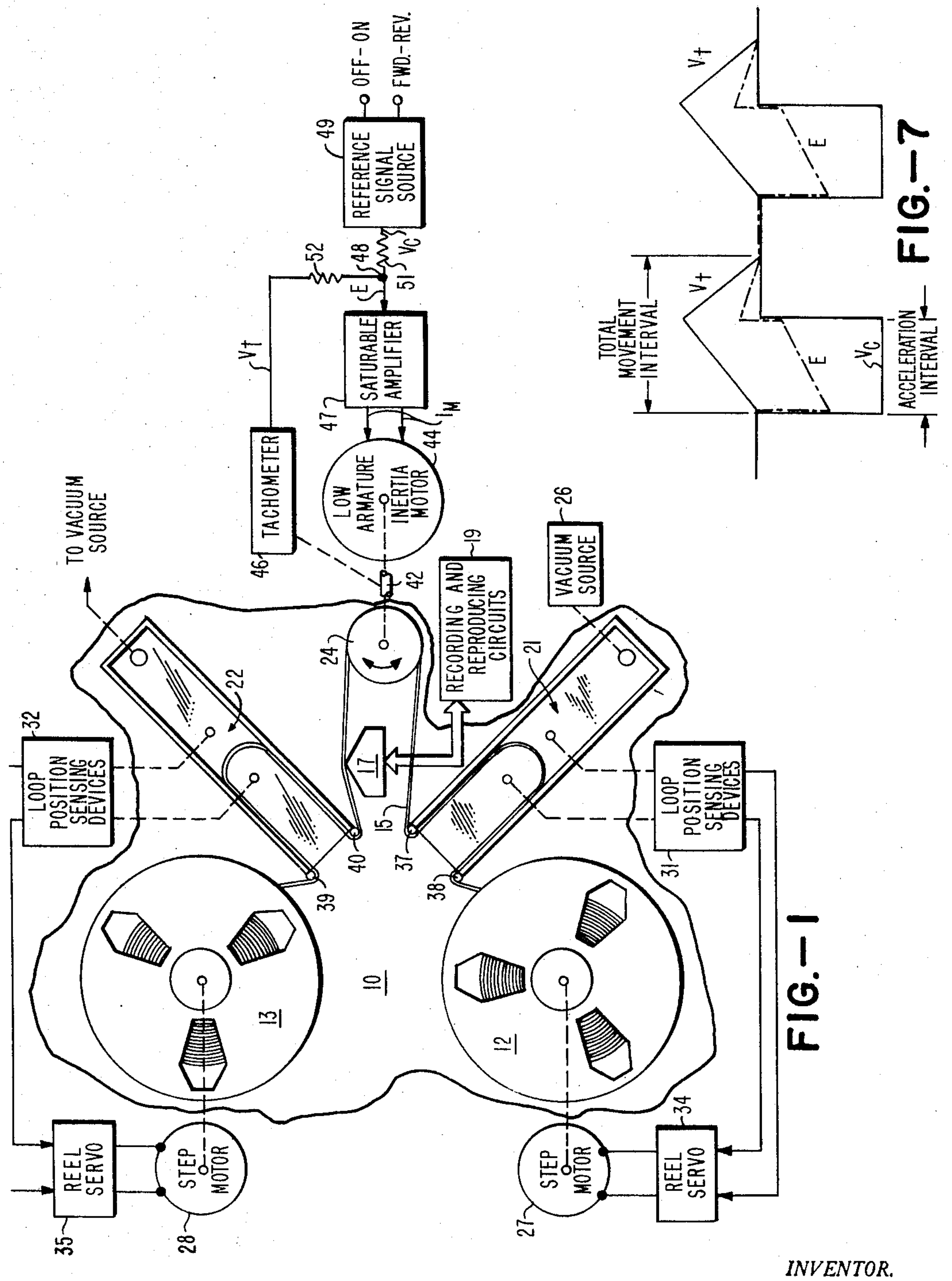
FIG. 1 is a combined, simplified elevation in block diagram representation of a motor drive system in accordance with the present invention used in conjunction with a magnetic tape recording system.
FIG. 7 is a chart of different variables plotted against time and illustrating the operation of the arrangement of FIG. 6.

A typical digital tape transport system, such as may employ the motor drive system of the present invention to best advantage, is illustrated in FIG. 1 as to its general organization. The details of such a system which are not concerned with particular aspects of the present invention have either been omitted or been illustrated generally where possible in order to simplify the description, but their use will be understood by those skilled in the art. The mechanical elements of the tape transport system are mounted on a front panel 10, and include a tape supply reel 12, and a tape take-up reel 13, the designations "supply" and "take-up" being used solely for convenience, between which the tape 15 is moved bidirectionally in a low friction, relatively low tension tape path. The tape 15 is to be driven in a forward or reverse direction past a magnetic head assembly 17 coupled to recording and reproducing circuits 19, which are interconnected with an associated data processing system (not shown). The data processing system or some other related means provides the forward and reverse, and off and on signals for controlling the tape transport mechanism. Inasmuch as the transfer of data and the provision of these control signals may be achieved by conventional means, no further explanation is provided herein.

The tape supply and take-up reels 12 and 13, a pair of vacuum chambers 21 and 22, and a centrally disposed drive capstan 24 are arranged symmetrically in a compact configuration on the front panel 10. Each of the vacuum chambers 21 and 22 is positioned between the capstan 24 and a respective one of the reels 12 or 13 to effect decoupling of the tape path from the high inertia reels. Each chamber includes a vacuum port coupled to a vacuum source 26 so that the tape may be drawn into the chamber to form a loop of variable length which constitutes the buffer needed for decoupling. The capstan 24 may be driven in a regular sequence of forward and reverse motions, but the relatively slower acting reels need not have a similar movement, since the buffer absorbs the relatively fast changes in tape movement between the chambers.

In order to maintain the length of the tape loops within selected limits, each of the reels 12 and 13 is driven by an associated motor 27 or 28, which is coupled in a servo loop which derives motor driving signals from a pair of position sensing holes in the sides of the chambers. Loop position sensing devices 31 and 32, containing differential pressure switches coupled to each of the sensing holes, provide error signals to the reel servo circuits 34 and 35, respectively. Each of the reel servos controls the movements of a connected reel motor 27 or 28, respectively, so that the reels 12 and 13 are turned appropriately to withdraw a tape from or supply a tape to the chambers during operation. This system for driving the reels 12 and 13, and conventional modifications of this system, such as the use of other forms of loop sensing and servo systems, are well understood by those skilled in the art.

In other respects, however, this tape transport system is materially different from the systems heretofore used, inasmuch as there are no high tension, high friction or high impact forces on the tape. The two chambers, 21 and 22 maintain substantially equal tension on the tape. The system is provided with two low friction guides 37, 38, and 39, 40 at the entrance and exit ends of the two chambers 21 and 22 respectively, which together with the contact of the tape at the chamber walls and at the magnetic head assembly, produce the only frictional or interial forces in the tape path to resist tape movement by the capstan 24. On the other hand, a highly frictional, and partially resilient drive capstan 24, such as one having a rubber or rubber-like surface, is preferred so that the tension on the tape 15 may be maintained at a relatively low value, such as 0.2 pounds.

The absence of friction in the tape path, along with the presence of low-inertia compliance mechanisms, insures that the tape 15 is driven solely by the action of the capstan 24. In addition, since the tape tension need be only in excess of that level needed to withdraw tape from the capstan 24 during acceleration, the tension can be maintained at a sufficiently low level to preclude introduction of any material loading to be overcome in turning the capstan 24 to move the tape 15. The inertia of the motor and capstan is substantially an order of magnitude greater than the inertia and frictional forces along the tape. Thus movement of the motor and capstan are determinative of the movement of the tape.

This facility for direct control of the tape movement may be utilized in a cooperative relationship with electronic means for generating signals for the precise control of the start, stop, and nominal speed characteristics of the tape movement. The capstan is directly coupled by a motor shaft 42 to allow armature inertia motor 44, such as the D.C. type of motor containing a planar rotor with windings disposed as printed circuit conductors thereon. This type of motor is preferred for the tape transport application, because it not only has low armature inertia but also has a substantially linear torque versus current characteristic over a relatively wide range. Thus, when coupled to a mechanical system having a very low and substantially constant counter torque, the magnitude and polarity of the applied current may be used to actively and completely control the operation of the mechanical system. A linear characteristic is not needed, however, as long as the torque characteristic continues to increase with increasing current.

In accordance with the invention, both the precise control of start and stop characteristics and the servo control needed to maintain nominal velocity are provided by a single servo system including a tachometer 46 for providing a feedback signal and a saturable amplifier 47 for providing current flow in either direction to the windings of the motor 44. In response to forward-reverse and off-on signals applied to a reference signal source 49 from the data processing system or the like, a positive or a negative polarity signal of an amplitude representative of the desired nominal velocity is applied through an input impedance, generally illustrated as the resistor 51, to the input of the saturable amplifier 47. The tachometer 46 is coupled to provide a negative feedback signal through a feedback impedance, generally illustrated as the resistor 52, to proportionally decrease the amplitude of the input signal to the saturable amplifier 47 as the tape approaches the desired velocity.

The saturable amplifier 47 has a high gain and a stable saturation output level so that for all signals of either polarity which are above a selected amplitude level, the output current therefrom to the motor windings is held constant. The input saturation level of the amplifier 47 is so chosen as to be an order of magnitude below the amplitude of the reference signal received from the reference signal source 49. Inasmuch as the feedback signal from the tachometer 46 is not sufficient to reduce the input signal to the amplifier below the selected saturation level until the motor speed closely approaches nominal velocity, the motor supplies a constant high torque required for quick acceleration.

After the input signal falls below the selected saturation level, the saturable amplifier 47 operates to provide normal servo operation in which the current supplied to the motor 44 is proportional to the difference between the current speed at nominal velocity and the actual speed attained. During starting of the motor 44, this proportional operation of the saturable amplifier 47 acts during the last position to gradually reduce the motor torque from the high level needed for its quick acceleration to the much lower level needed to maintain nominal velocity, thus preventing the motor 44 from overshooting the desired nominal speed. Thereafter, the motor drive system performs in conventional servo fashion to provide the error signal needed in stabilizing the tape transport system at nominal velocity.

Figure 2:
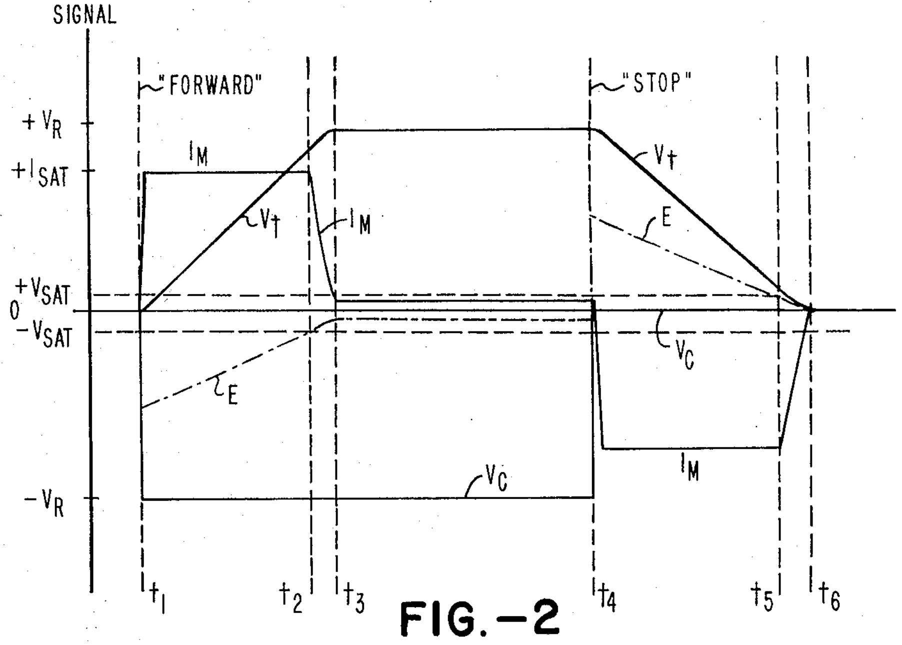
FIG. 2 is a graphical showing of variations with respect to time of various system parameters illustrating the characteristic operation of motor drive systems in accordance with the invention.

Referring now to FIG. 2, which illustrates by means of waveform diagrams the operation of the motor drive system, it is assumed, for the purposes of this illustration, that in particular time $t_1$ a "forward" command in conjunction with an "on" command is received by the reference signal source, which immediately reacts to provide a negative input voltage $V_c$ of an amplitude $-V_R$ for the saturable amplifier 47. The error or difference signal, E, is represented by the dot-dash line, and represents the difference of the signals derived through the input impedance 51 and the feedback impedance 52 at the circuit junction 48. The difference signal is initially greatly in excess of the saturation level $-V_{SAT}$ and causes the motor current $I_m$ delivered from the output of the amplifier to quickly increase to a stable saturation magnitude $+I_{SAT}$.

The motor reacts to the constant current by accelerating at a constant rate under the constant torque until time $t_2$. The feedback voltage $V_t$ from the tachometer 46 increases with motor speed in linear fashion to gradually decrease the difference signal E applied to the input of the saturable amplifier 47. At time $t_2$ the difference signal E has been reduced to saturation level, the amplifier 47 commences proportional operation to quickly reduce the motor current $I_m$ between the times $t_2$ and $t_3$, and thereafter perform as a normal servo in maintaining nominal speed. The error signal E has at the same time dropped to the level needed to provide a difference signal sufficient to overcome the small frictional forces on the tape and motor with both operating at nominal velocity.

Receipt of a "stop" command at time $t_4$ results in a similar sequence of events for decelerating the motor. The reference signal $V_c$ from the reference signal source 49 is immediately returned to zero potential. The feed back voltage $V_t$ is now the only component of the difference signal E to the saturable amplifier 47. The motor current, $I_m$ quickly changes the saturation level of opposite polarity to provide a constant deceleration torque to the motor until time $t_5$, at which time the negative feedback signal $V_t$ and the difference voltage E reach saturation level $+V_{SAT}$ thereby causing the motor current $I_m$ to gradually decrease until the motor is stopped very shortly thereafter at time $t_6$.

It should be realized that the system operates in identical fashion upon receipt of a "reverse" command except that the direction of movement and the polarity of the illustrated signals are reversed. Also, it should be noted that the stop characteristic of the motor drive system is, for all practical purposes, identical to the start characteristic in either the forward or reverse direction, as long as the reference signal source 49 and the saturable amplifier 47 are able to provide identical operation in either polarity.

Figure 3:
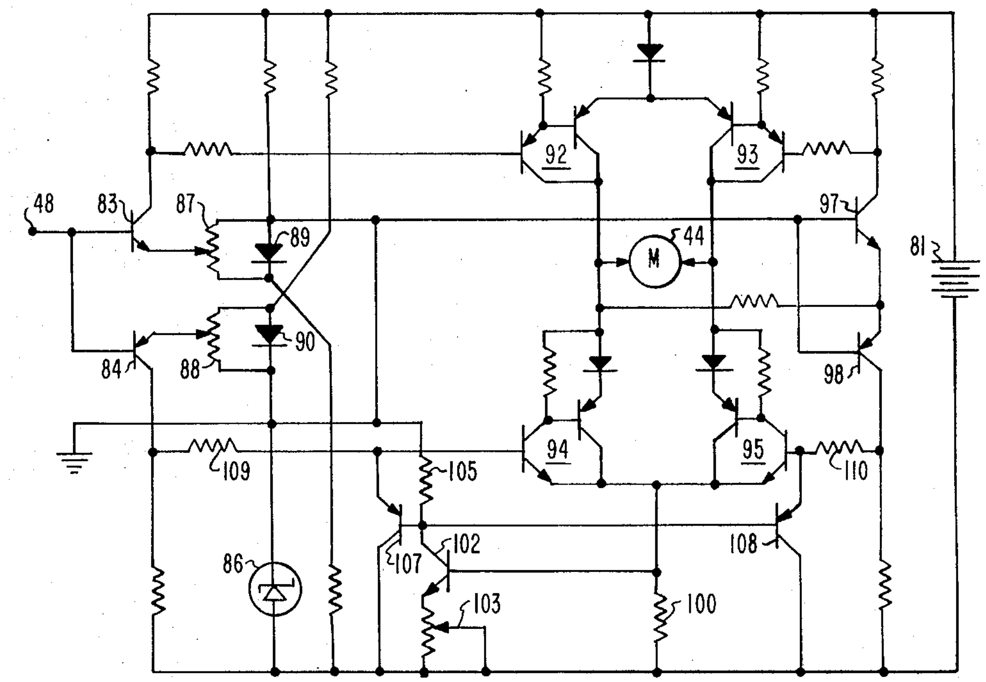
FIG. 3 is a simplified circuit diagram illustrating a saturable amplifier in accordance with the invention.

In FIG. 3, as shown, a servo amplifier may be operated from a single power supply 81 to provide motor current in either direction to windings of the capstan motor 44. The input stage of the amplifier has a complementary pair of transistors 83 and 84 which have their bases connected to form a single amplifier input terminal 48 for receiving the difference signal from the reference signal source 49 and the tachometer 46. A signal ground is established by use of the small Zener diode 86 having a reverse breakdown voltage amplitude half the amplitude of the source 81. Two separate potentiometers 87 and 88 are used to apply a selected fraction of the voltage developed across the respective diodes 89 and 90 to bias the emitters of the input stage transistors 83 and 84. If both of the emitters are connected directly to ground, then for zero input signal on the terminal 48 both transistors 83 and 84 are off. To turn either on, the difference signal applied to the base must be large enough to overcome one of the base-to-emitter threshold voltages, which for transistor 83 is a positive voltage and for transistor 84 a negative voltage. Therefore, the amplifier has a dead band between the positive and negative threshold voltages in which an input signal of insufficient amplitude causes no output. Therefore, the potentiometers 87 and 88 may be adjusted to apply a small forward bias which aids in overcoming the thresholds in order to reduce the dead band, thereby making the amplifier 47 more sensitive. In order that the width of the dead band remain constant with temperature, the diodes 89 and 90 can be of a type having a negative temperature coefficient of voltage to compensate for the fact that the threshold voltage of a transistor reduces with temperature. In practice, the potentiometers 87 and 88 are adjusted to give a dead band of a minimum value consistent with thermal stability.

As long as there is a small dead band maintained, no steady state input signal can turn on both transistors 83 and 84. However, this dead band manifests itself during the final portion of the stop characteristic inasmuch as the error signal falling within the dead band prevents the motor from receiving further decelerating current from the amplifier 47. Thus, during this period, the motor coasts to a standstill only after the retarding force of very light friction. For this reason, it is important that the dead band be made as narrow as feasible.

The motor 44 is connected between the output terminals of a bridge circuit consisting of four pairs of compound connected transistors 92, 93, 94, and 95 interconnected into a bridge circuit so that current may be passed in either direction from a single power source 81. Each pair of compound connected transistors can be considered as a single transistor element with greater gain and greater linearity than normally provided by using a single transistor. Generally, the bridge transistor elements 92 and 94 on one side of the motor 44 receive the switching voltages produced at the collector terminals of the input stage transistors 83 and 84, respectively. The voltage change reflected on that side of the motor by switching on element 92 and 94 is then applied to the emitter terminals of a pair of complementary transistors 97 and 98 to turn on the associated transistor element 93 or 95, located in the diagonally opposed leg of the bridge so that current is passed in the selected direction through the motor 44.

A small valued resistor 100 is connected in series circuit with the power source 81 to measure the current passing through the bridge arrangement to the motor 44. The voltage developed across this monitoring resistor 100 is applied to the base terminal of a transistor 102, which can be selectively biased by means of the potentiometer 103 so that the transistors 107 or 108 turn on only in the event that the monitored current exceeds a certain predetermined level. The collector of the transistor 102 is coupled through a load resistor 105 to ground, and is also coupled directly to the base electrodes of two further transistors 107 and 108 to selectively control their emitter-to-collector impedances.

The voltages developed at the collector terminals of the transistors 84 and 98 are connected through resistors 109 and 110, respectively, to control the transistor bridge elements 94 and 95. These resistors 109 and 110 form a voltage divider circuit with the variable impedance transistors 107 and 108, respectively, thereby permitting control of the voltage and current applied to control the transistor elements 94 and 95 of the bridge.

For illustration, the operation of the circuit is described for a positive signal applied at the input terminal 48 of the amplifier. The positive signal, if above the threshold level, turns on transistor 83 resulting in the transistor bridge element 92 being turned on. The terminal on the left hand side of the motor becomes positive with respect to ground and turns on the transistor 98. This in turn switches on the diagonally opposed bridge element 95 thereby permitting the current to flow from the source 81 through a series path consisting of the transistor bridge element 92, the motor 44, the transistor bridge element and the sensing resistor 100. If the motor current is large enough, that is, when the input error signal exceeds the saturation level, the voltage developed across the sensing resistor 100 turns on the transistor 102, thus lowering the voltage at the base of the transistor 108 and reducing the voltage on the base of the transistor bridge element 95 to reduce the current flow therethrough to a set level. This permits the saturation level of motor current to be maintained constant even though the input error signal may vastly exceed the predetermined saturation level.

Figures 4, 5, 6:
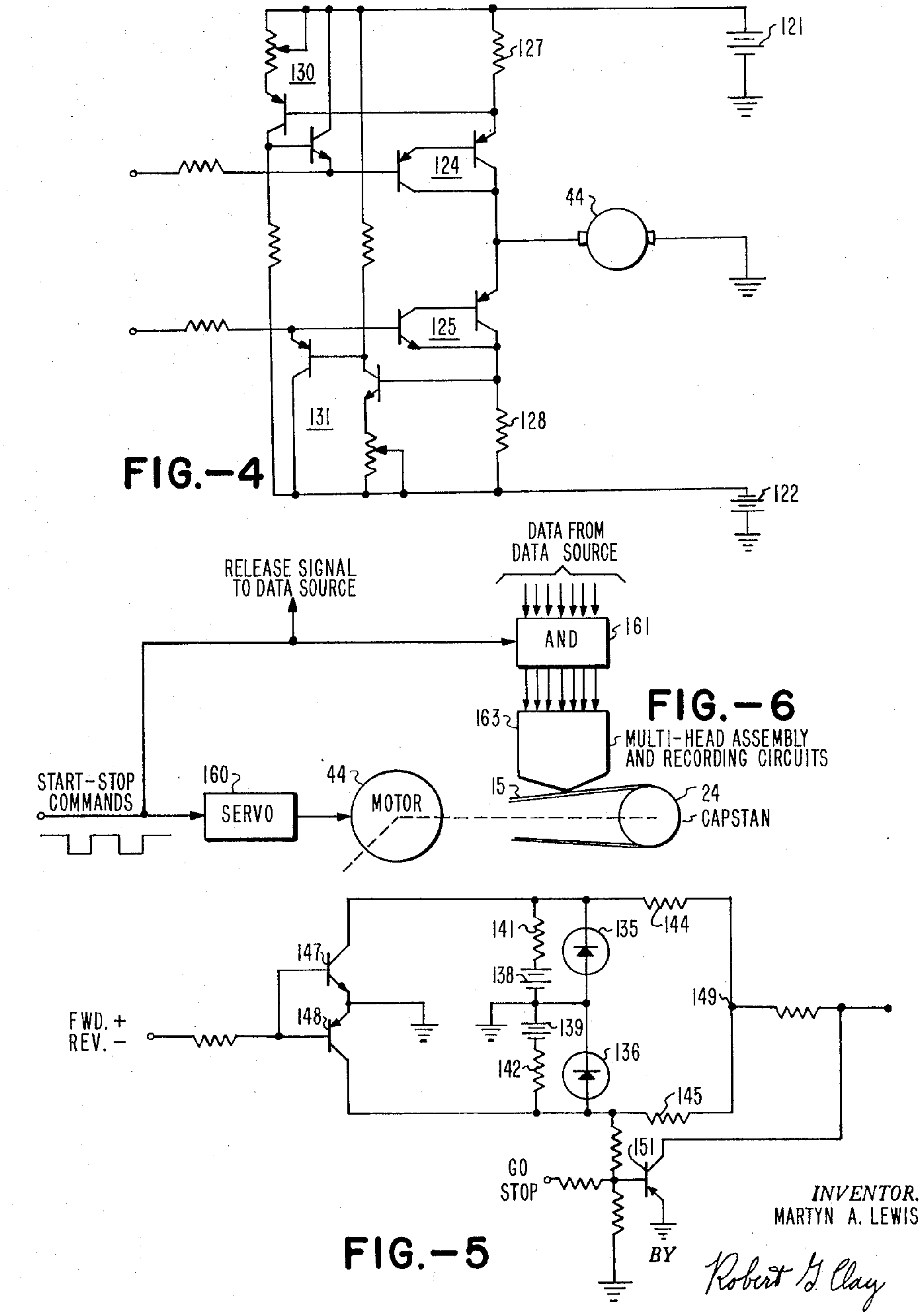
FIG. 4 is a simplified circuit diagram of an alternative to the amplifier illustrated in detailed form in FIG. 3.
FIG. 5 is a schematic circuit diagram of an input circuit in accordance with the invention, which provides closely regulated reference signals of either polarity in response to applied command signals.
FIG. 6 is a block diagram representation of an incremental tape transport drive system in accordance with the invention.

Referring now to FIG. 4, an alternative arrangement is shown whereby the additional transistors required for the bridge arrangement may be omitted, but the motor drive system requires a pair of opposite polarity power sources 121 and 122 to provide both directions of current flow through the motor 44. In this arrangement, separate compound connected current amplifiers 124 and 125 receive the switching signals from the input stage, and pass the current from the respective power source 121 or 122. It is also necessary in this arrangement to provide separate current monitoring resistors 127 and 128 along with closely matched transistor circuits 130 and 131 for controlling the proportion of voltage from the input stage applied to control current through the transistor elements 124 and 125.

FIG. 5 illustrates a preferred form of a reference signal source for providing the necessary regulation of the reference signals applied to the amplifier output in accordance with the command signals received. A pair of voltage regulating Zener diodes 135 and 136 are each coupled to a respective one of the opposite polarity power sources 138 and 139 through dropping resistors 141 and 142 to establish fixed voltage amplitudes with respect to ground in both polarities. Two identical resistors 144 and 145 form a voltage divider circuit across which the opposite polarity voltages are connected.

A pair of complementary gating transistors 147 and 148 have their base terminals connected one to the other for receiving the forward and reverse command signals from the external data processing system. Both of the transistors 147 and 148 have their emitters connected to ground and are connected in parallel with a respective one of the Zener diodes 135 or 136. Upon receipt of a command signal, one of the transistors 147 or 148 is turned on to short the voltage established across the respective one of the Zener diodes 135 or 136 and establish ground potential on one side or the other of the voltage divider network. In the absence of a command signal, the equal voltages on either side of the voltage divider resistors 144 and 145 establish a ground potential at an input terminal 149 located between the two resistors 144 and 145. However, when a command signal switches on one of the gating transistors 147 or 148, a voltage is applied to only one side of the divider with the other side grounded thus changing the potential at the output terminal 149 to a level which is some fraction of the reference voltage remaining.

The forward and reverse command signals received at the input terminal may vary over wide ranges since all that is necessary is to turn on one of the transistors 147 and 148. The reference signal circuit thus provides closely controlled voltage amplitudes of either polarity while also providing fail safe operation inasmuch as there can be no reference voltage output in the absence of a command signal.

If desired, an additional go-stop control function may be added to the circuitry by using a gating transistor 151 normally biased to full conduction to maintain the output terminal grounded. When a "go" command signal is supplied to its base from a second input terminal, the transistor 151 is turned off, thereby allowing the reference signals to appear at the output terminal.

The motor drive systems heretofore described may be used without modification or additional equipment to provide incremental or step-by-step advance of a driven member. This is of particular value with magnetic tape systems used in cooperation with processing or output systems which may operate at relatively slower rates than high speed computers or which operate intermittently within a data message interval. Heretofore, punched card of paper tape mechanisms have been used for recording data under these conditions, and paper tape-to-magnetic tape converters have then been used for generation of the magnetic tape record. The example of FIG. 6, as described in conjunction with FIG. 7, shows how a single system in accordance with this invention may be used for incremental as well as continuous recording.

All that is required for positive incrementing is that the energizing signal ($V_c$ in FIG. 7) be terminated at a selected time for a predetermined distance of tape movement. If the acceleration interval is terminated before constant speed is reached, deceleration is immediately begun. Thus the slope of the curve $V_t$ changes from a fixed ascending (in this case linear) characteristic to a fixed descending characteristic (also linear here), and the total time of movement is in each case determined solely by the duration of the applied energizing pulse. Because the slopes of the velocity curves are controlled, and constant, the increment of movement is positively controlled and constant. Note that this is true whether or not the slopes are linear, and that over reasonably small distances the system may reach constant speed before decelerating.

The system of FIG. 6 uses the start-stop command signal to the servo 160 to control the recording of data on the tape 15. Thus the leading edge of the energizing pulse actuates AND gates 161 which transfer a frame of digital data to the multi-head assembly and recording circuits 163. The energizing pulse may also be coupled as a release signal to the data source, to indicate that a new character may be made available for recording. The elements are shown only in general form, inasmuch as many gating arrangements may be used in conventional fashion to accomplish the desired functions. For example, the data itself may trigger a pulse generator to initiate the incremental movement. With both these systems the recording is effected with the tape stationary, or without substantial movement in the first few microseconds of the incrementing interval. At completion of the interval the record and increment process may immediately be repeated.

Recording may be effected at an intermediate time in the interval of movement by proper delay of the gating pulse for the data. The use of the system for incrementing in a bidirectional fashion will be understood, although it is not shown. Further, those skilled in the art will recognize that this form of incrementing system may be used for a wide variety of transports for web members.

It should be understood that various changes in the details, which have been herein described and illustrated in order to explain the nature of the invention, may be made by those skilled in the art within the principle and scope of the invention as expressed in the appended claims.

What is claimed is:

1. A motor drive system comprising a motor having an output torque substantially proportional to the input current applied, a saturable amplifier means coupled to drive the motor in two distinct operating ranges and having a linear transfer characteristic for input signals below a selected level, means for providing a signal voltage to the saturable amplifier means proportional to the difference between the actual motor speed and a desired motor speed, and means for operating said saturable amplifier means above said selected level except when the actual motor speed is within a predetermined range of said desired motor speed.

2. A motor drive system comprising a direct current motor having an output torque proportional to the magnitude of an applied driving current, a saturable amplifier means having a substantially linear transfer characteristic for input signals below a selected level, tachometer means coupled to the motor to provide a feedback voltage signal proportional to the actual speed of the motor, a command circuit for providing a command voltage signal proportional to the desired motor speed, means connected to receive the feedback voltage signal and the command voltage signal for providing a difference voltage signal proportional to the difference between the actual motor speed and the desired motor speed, and variable biasing means for selecting a portion of said difference voltage signal for application to the saturable amplifier means such that the selected portion of the difference voltage signal is below said selected level only when the actual speed is approximately equal to the desired motor speed.

3. A bidirectional motor drive system comprising an electrical motor capable of operating in either rotational direction in accordance with the polarity of the applied input current, amplifier means connected to apply an input current to the electrical motor in accordance with the polarity and magnitude of an applied input signal, means for operating said amplifier with a linear transfer characteristic for input signals above a threshold and below a saturation level and for operating said amplifier at a constant current for input signals above the saturation level, command means for applying a signal to said amplifier which is proportional to a desired motor speed and having a polarity indicative of the desired motor direction, means for providing a difference signal to the amplifier means which is proportional to the desired motor speed minus the actual motor speed, and variable biasing means for adjusting said threshold to provide improved response for small input signals.

4. In a capstan tape drive system, a system for bidirectionally driving the tape comprising a capstan in constant contact with the tape surface, a motor coupled to drive the capstan and providing an output torque proportional to the magnitude of the applied current, means for sensing the actual speed and direction of the motor, means for providing an input signal indicative of the desired motor speed and direction, means responsive to the sensing means and the input signal means for delivering a constant level current to the motor having a polarity dependent upon the desired rotational direction in response to input signals greater than a predetermined magnitude and for delivering a current proportional to the difference between the desired speed and the actual speed in response to input signals less than said predetermined magnitude, and threshold setting means for adjusting the minimum amplitude of signal to the current delivering means.

5. A motor drive system comprising a power amplifier for providing a substantially constant current to the motor in response to an applied input signal above a predetermined magnitude, means for sensing the actual motor speed to provide a negative feedback signal to the amplifier to reduce the magnitude of the applied input signal, and command means for providing command signals to the amplifier indicative of desired motor speeds, the signal applied to the amplifier being proportional to the difference between the desired motor speed and the actual motor speed over a predetermined range, said command means including means for generating regulated command signals in response to applied unregulated control signals.

6. A motor speed control system comprising an amplifier bridge circuit having input means for delivering controlled amounts of current to the motor in a selected direction depending upon the amplitude and polarity of applied control signals, command means for generating regulated signals of selected polarity and constant magnitude to be applied to said amplifier bridge in response to applied gating signals, variable impedance means connected in parallel with the input means of the amplifier bridge, and sensing means connected to the variable impedance means for sensing the current flow through the amplifier bridge and applying a signal to vary the impedance of the variable impedance means to stabilize the amplitude of the signal applied to the amplifier bridge circuit.

7. A motor drive system in accordance with claim 2 wherein said variable biasing means includes threshold setting means for determining the minimum amplitude of signals applied to the saturable amplifier means.

8. A motor drive system in accordance with claim 2 wherein said command circuit includes a balanced voltage divider circuit connected between opposite polarity voltages and gating means responsive to respective input signals for selectively disabling one polarity voltage to establish a fixed proportion of the other polarity voltage as the command voltage signal.

9. A motor drive system in accordance with claim 2 further including an input circuit means for providing a reference signal of either polarity at a regulated amplitude including means for establishing positive and negative polarity voltages of selected amplitude, a voltage divider having matched impedances on either side of an output terminal, said voltage divider being connected across said positive and negative voltage means, and gating means responsive to applied command signals for selectively shunting one of said voltages to produce a voltage signal of selected polarity and constant amplitude at said output terminal.

10. A motor drive system in accordance with claim 8 wherein said opposite polarity voltages are derived from a pair of regulated voltage sources, and the gating means are connected respectively between one of said opposite polarity voltage sources and a point of reference potential and are arranged to establish a low impedance path between the associated voltage source and said reference potential point upon actuation in response to an applied input signal.

References Cited by the Examiner

UNITED STATES PATENTS

| | | | |
|---|---|---|---|
| 1,880,367 | 10/1932 | Stansburg et al. | 318—396 |
| 1,885,373 | 11/1932 | Planche | 318—396 |
| 2,708,731 | 5/1955 | Morel et al. | 318—326 |
| 2,722,647 | 11/1955 | Esselman et al. | 318—326 |
| 2,870,390 | 1/1959 | Ludwig | 318—327 |
| 3,084,319 | 4/1963 | Hooijkamp | 318—332 |
| 3,096,470 | 7/1963 | Kalenian | 318—332 |
| 3,097,332 | 7/1963 | Mullin | 318—314 |
| 3,185,364 | 5/1965 | Kleist | 226—24 |

FOREIGN PATENTS

| | | |
|---|---|---|
| 911,796 | 11/1962 | Great Britain. |

ORIS L. RADER, *Primary Examiner.*

S. GORDON, J. C. BERENZWEIG, *Assistant Examiners.*

Notice of Adverse Decision in Interference

In Interference No. 95,904 involving Patent No. 3,293,522, M. A. Lewis, MOTOR DRIVE CIRCUITS, final judgment adverse to the patentee was rendered Mar. 12, 1970, as to claims 1 and 5.

[*Official Gazette June 2, 1970.*]